April 21, 1964 R. P. GUTTERMAN 3,130,393

INFORMATION STORAGE DEVICE

Filed May 13, 1959 3 Sheets-Sheet 1

INVENTOR
ROBERT P. GUTTERMAN

BY Cushman, Darby & Cushman
ATTORNEYS

INVENTOR
ROBERT P. GUTTERMAN
BY Cushman, Darby & Cushman
ATTORNEYS

April 21, 1964 R. P. GUTTERMAN 3,130,393

INFORMATION STORAGE DEVICE

Filed May 13, 1959 3 Sheets-Sheet 3

INVENTOR

ROBERT P. GUTTERMAN

BY Cushman, Darby & Cushman

ATTORNEYS

United States Patent Office 3,130,393
Patented Apr. 21, 1964

3,130,393

INFORMATION STORAGE DEVICE

Robert P. Gutterman, Bethesda, Md., assignor to Sperry Rand Corporation, New York, N.Y., a corporation of Delaware Filed May 13, 1959, Ser. No. 812,962
30 Claims. (Cl. 340—174.1)

This invention relates generally to an information storage system useable, for example, in a digital data processing system, and more specifically to a drum-like laminated structure made up of thin disc-like record members used for large scale random access storage of magnetically recorded information.

In computing and data recording arts, it is desirable to store vast quantities of pertinent information for a certain length of time and yet have this information rapidly available when needed. Many schemes have been devised to solve the problem of high speed, low access time mass storage. Among these are conventional magnetic core memories, electrostatic storage and the revolving magnetic drum. As the access time (i.e., the time it takes the computer to select or find a storage location) is decreased, the storage capacity of the memory is actually decreased. To meet all applications, it is often necessary to sacrifice access time for storage capacity.

In accordance with this invention, though the access time may be relatively low, the storage capacity of the system is quite high since a large number of large diameter laminations (disc records) can be employed. These are releasably held together as a laminated structure and means are provided to cause the structure to spread open at a given lamination interface, thereby providing an access gap for transducing information onto or from at least one of the lamination faces on either side of the gap. Read-write heads are inserted into the gap for the magnetic transducing purposes.

It is accordingly a primary object of the present invention to provide a large capaciy, compact, laminated, information storage device with relatively low access times.

Another object in conjunction with the foregoing object is the provision of means for separating the laminated device at a preselected one of the lamination interfaces to form an access gap for information transducing purposes relative to the lamination faces forming the gap.

Another object in conjunction with the foregoing objects is to provide a large capacity storage device which employs a fluid pressure controlled system for selecting any given one of the lamination interfaces at which the gap is to be formed and for selecting the particular location or locations on the gap lamination faces from which or on which information is to be transduced.

Still another object of the present invention in conjunction with any of the foregoing objects is to provide a means whereby a voluminous quantity of binary information can be stored in a relatively small amount of space.

Still other objects of this invention will become apparent to those of ordinary skill in the art by reading the following detailed description of the exemplary embodiments of the invention and the appended claims. The various features of the exemplary embodiments according to the invention may best be understood with reference to the accompanying drawings, wherein:

FIGURE 1 is a perspective view of the drum assembly with the shroud removed;

FIGURES 2A, 2B and 2C schematically illustrate various steps of the access cycle;

Figures 1, 5, 8:
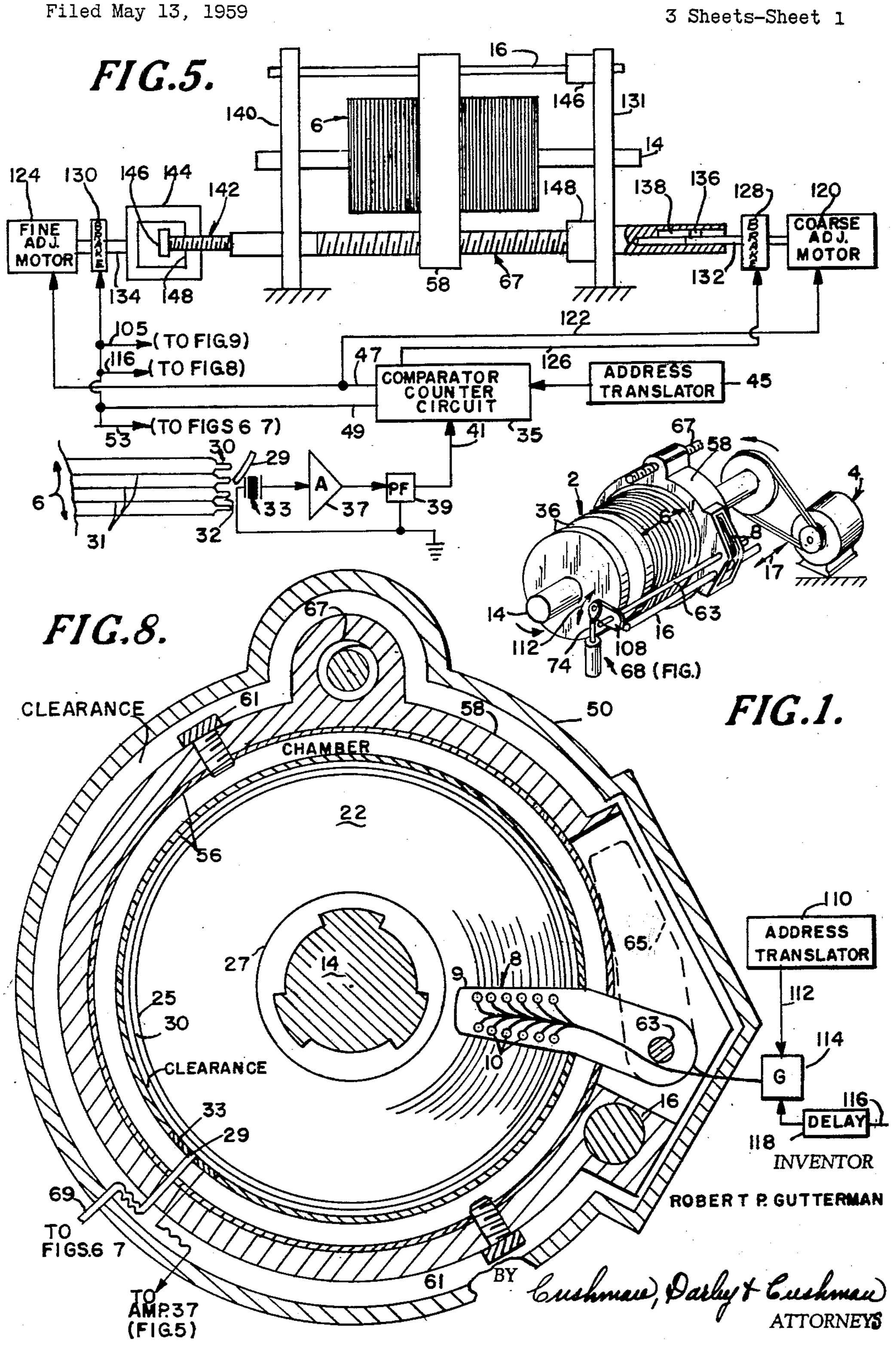
FIGURE 5 is a schmatic diagram of exemplary lamination counting and axial locating apparatus.
Figure 9:
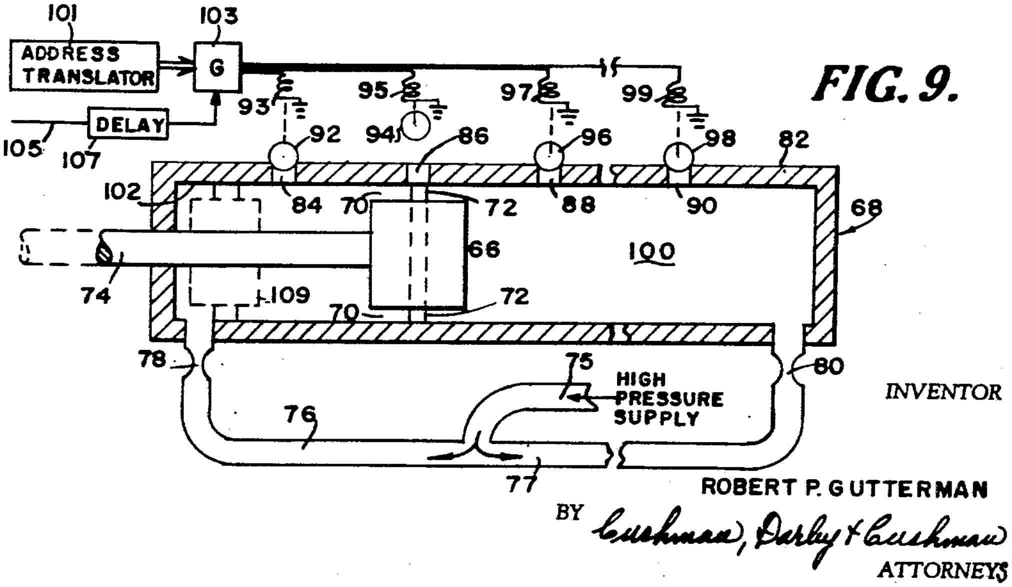
Figures 6, 7, 10:
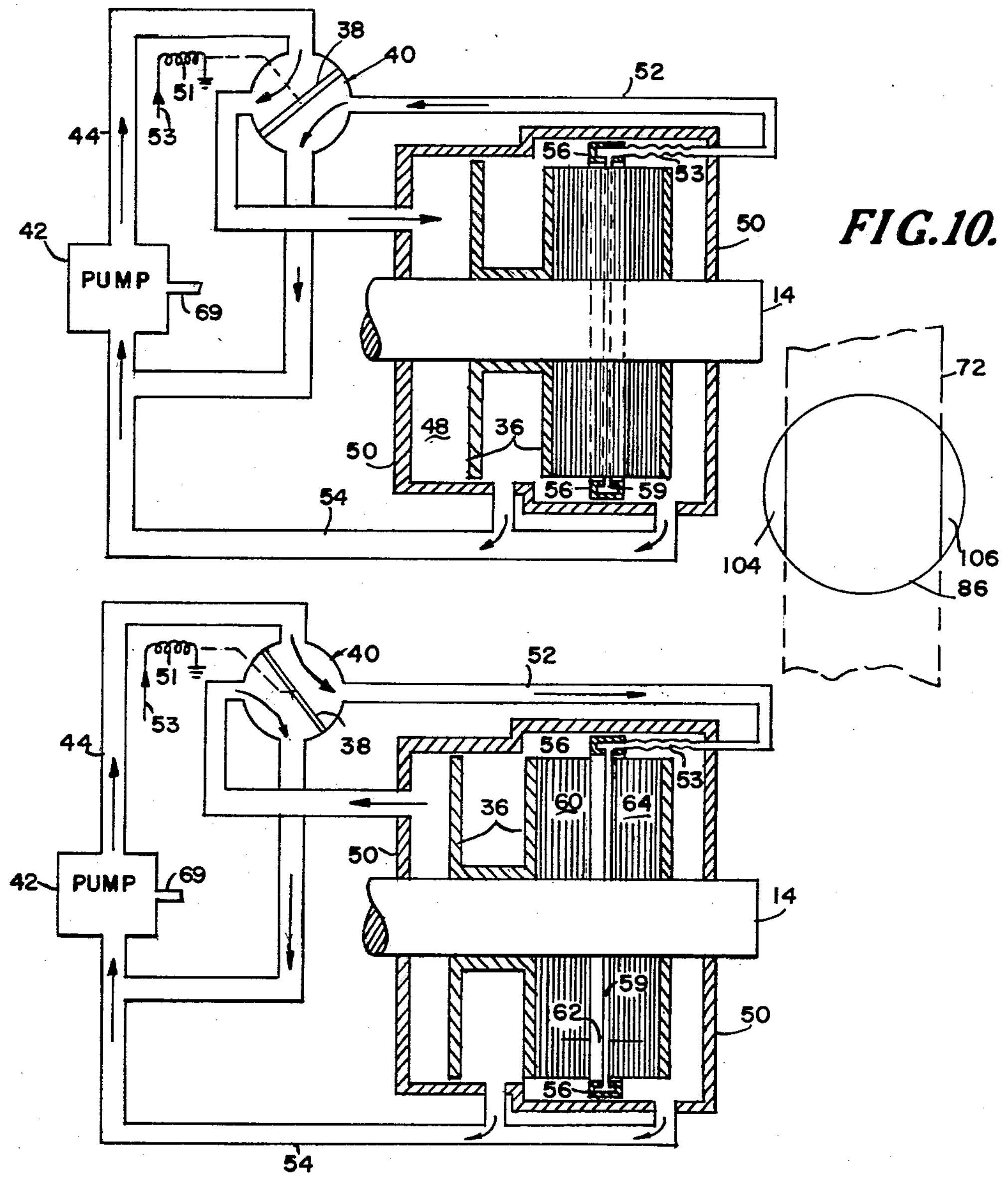
FIGURE 6 is a schematic showing of the pressure system holding the laminated drum together.

FIGURE 7 schematically shows the pressure system forcing the laminated drum to divide;

FIGURE 8 is a sectional view of the drum cross section taken through the head and annular orifice carriage;

FIGURE 9 shows exemplary embodiment of apparatus used to radially position the transducing heads; and FIGURE 10 is a detail showing an exemplary air vent of FIGURE 9 when the system is in its balanced condition.

Figure 2:
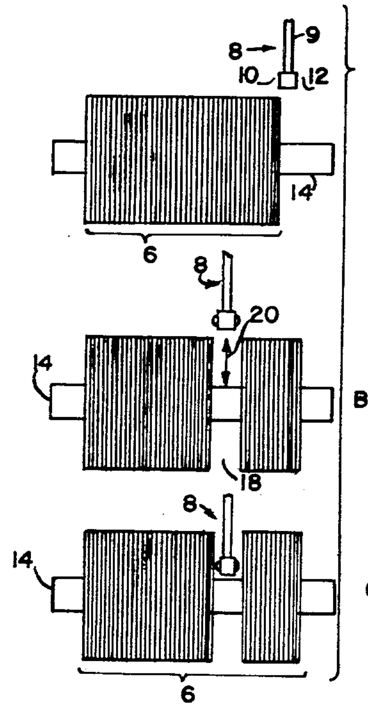

The laminated drum storage system of this invention is based on the use of a continuously rotating cylindrical drum comprising a plurality of free circular laminations or record discs, which when compacted effectively give the appearance of a solid drum. The storage may be considered as three dimensional, operating in a cylindrical coordinate system. The basic form of the system without its air tight shroud is illustrated in FIGURE 1. Drum 2 is driven by a suitable means such as motor 4. It is desired to locate an information unit or point in the storage volume 6 of cylindrical records both axially and radially during continuous rotation of the drum. To accomplish this, a transducer assembly 8, comprised of an arm 9 (FIG. 8) holding a plurality of conventional read-record magnetic transducing heads preferably arranged with heads 10 being in two vertical rows on one side of arm 9 (as shown in FIG. 8) and with heads 12 similarly being on the other side of the arm (as schematically shown in FIG. 2A), so as to sense a plurality of tracks on adjacent laminations, is arranged to allow motion of the heads parallel to the axis of drum shaft 14 in either direction along shaft 16 (FIG. 1) as indicated by arrow 17. When a particular point in the drum volume is addressed as hereinafter described, the magnetic head assembly 8 is moved along its axial path as illustrated in FIGURES 2A and B, to a preselected point over the drum periphery. An access gap 18 is opened at a lamination interface, by means of techniques yet to be explained, and a division of the drum results as shown in FIGURE 2B. The transducing assembly is then inserted into gap 18 (FIG. 2C) to the desired radial position, operated, and withdrawn as indicated by arrow 20. The transducing assembly may then be returned to its initial rest position at one end of the drum as shown in FIGURE 2A (although such returning is not essential to this invention, as will be later apparent), and the access gap is closed by automatically causing an axial motion of the drum laminations. The system is then ready to perform another access cycle.

Figure 3:
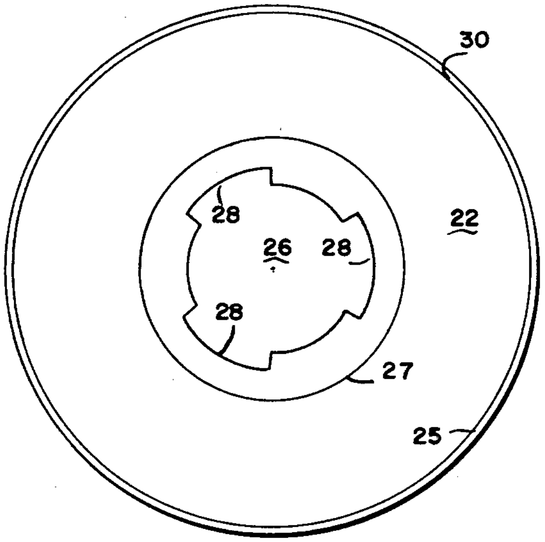
FIGURE 3 is a plan view of an exemplary record surface.
Figure 4:
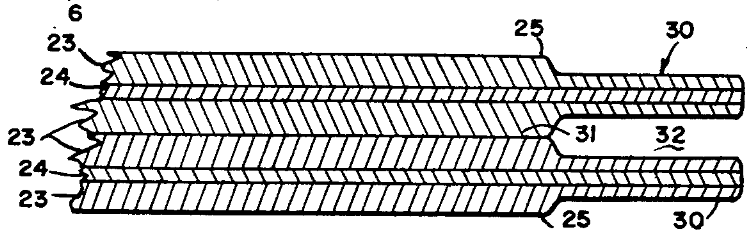
FIGURE 4 shows a detailed cross-sectional view of part of two records like that of FIGURE 2.

A typical drum lamination is illustrated in elevation in FIGURE 3. The lamination faces one of which is the record surface 22, are preferably made of a polyester film, such as that sold under the trademark "Mylar," coated with a magnetic material having rectangular hysteresis loop characteristics. In practice, a "Mylar" film is preferable for the reason that it has a tensile strength and elastic limit equivalent to that of brass, a density of only 0.05 pound per cubic inch, and good dimensional stability in regard to temperature and humidity variations, but limitation to "Mylar" is not intended. It has proven desirable to sublaminate each drum lamination as shown in FIGURE 4, which is an enlarged partial cross-sectional view of two records, each like the one in FIGURE 3, so as to employ a sandwich structure of a "Mylar" film 23 on both sides of a thin, centered, conducting sheet 24 such as aluminum so as to draw off charges of static electricity generated when the laminated drum is in contact with dry air (as it is when the pneumatic techniques described below are employed) and minimize the effects of eddy currents. A resulting disc has a thickness of about 0.010 inch from its recording surface edge 25 to its centered aperture 26. This disc is mechanically joined at its center aperture to an aluminum central hub 27 (FIGURE 3) which slides freely on central shaft 14 in an axial direction but which is prevented from any rotation about the shaft by keyways 28.

Since pneumatic techniques are preferably used in the performance of various other mechanical functions in this system as will be later apparent, it is convenient to use pneumatics to effectively count the number of discs or lamination edges to determine the lamination interface at which the access gap should be opened. This may be accomplished through the use of pressurized fluid such as air from a small jet 29 (FIGURE 5) directed toward the peripheral surface of the drum. As shown in FIGURE 4, the lamination rims or outer edges 30, which are unused for recording purposes, are narrowed as by beveling or otherwise made somewhat thinner than the inner part of the records thereby forming at each lamination interface 31, a gap 32 between each two adjacent lamination edges 30. When all laminations are contiguous, so that the gaps 32 are approximately equal in width with edges 30 (preferable but not necessary), and the air jet is moved across the drum periphery in the axial direction (by means later described), the jet will encounter a number of annular gaps 32 (or lamination interfaces 31) equivalent to the number of laminations traversed. The air jet, in passing over these annular gaps, will experience sudden variations in air pressure. A barium titanate crystal microphonic detector 33 (FIGURE 5), is used to sense these pressure variations and the output of the crystal detector is delivered to a comparator counter circuit 35, suitable amplifying means 37 and pulse forming means 39, if desired.

Alternatively, magnetic, optical, or any other suitable counting methods may be employed. Since the thin outer rim 30 of the record member is not used for recording, it can conveniently be suitably coated and magnetized so that a voltage variation can be detected by a current carrying sensing element passing through the resulting magnetic field. Also, if a light source is suitably located near the periphery of the drum surface and a reflecting or polished surface is located on each lamination edge, a photoelectric cell can be used to detect the difference in illumination resulting from the absence of a polished surface in the interlamination spaces. These two indications can be used in a manner similar to the FIGURE 5 apparatus so far described to provide discrete electrical signals on line 41 to be counted.

However obtained, the number of lamination interfaces or edges may effectively be electronically counted and compared in circuit 35 to a number, on line 43 from address translator 45, which corresponds to the desired gap or interface location address.

The translated address number is effectively the distance which jet 29 must be moved to effect a lamination interface or edge count in circuit 35 which equals the translated address number. Circuit 35 is later described more fully in connection with the axial locating system which is controlled by the output signals on lines 47 and 49.

FIGURE 6 illustrates schematically a system for dividing the laminated drum when a predetermined interface is selected. The individual laminations, supported by the central shaft 14, are releasably held together as by compression between a fixed end plate 34 and a movable H-shaped ram 36 at the other end. Plate 34 and ram 36 are preferably secured to shaft 14 to rotate therewith as do the laminations, but ram 36 is movable along the length of the shaft as are the laminations. To compress the drum, solenoid 51 is de-energized (by an "off" signal on line 53 from circuit 35 of FIGURE 5) to set vane 38 of valve 40 in the position shown in FIGURE 6. High velocity pressurized air flows from differential pneumatic pump 42, through line 44 and valve 40, to line 46 leading to the chamber 48 formed by the air tight shroud 50 and the left plate of movable ram 36. This high pressure air, acting on the head area of ram 36 (effectively a piston) forces the laminations together against the fixed end plate 34. The relationship between the compressed drum and the annular chamber structure 56 is essentially that of a long piston inside of a short, open-ended cylinder.

The leakage air is returned to the pump 42 by means of lines 52 and 54 connected to the annular chamber structure 56 and the shroud 50 respectively. The return of the leakage air conserves the dry air supply and reduces the amount of make up air needed. Dry air is preferable since air containing contaminants such as moisture and dust may impair the operation of the system.

When the counting means of FIGURE 5 counts off the number of lamination edges equal to the interface address desired, the laminated drum can then be divided so that the transducing head assembly may be inserted as shown in FIGURE 2C. Solenoid 51 is consequently energized (by an "on" signal from circuit 35, FIGURE 5) to turn vane 38 to the position shown in FIGURE 7 so that the pressurized air from pump 42 is directed through line 52. Turning the vane 38 to the position shown in FIGURE 7 also removes the air pressure from ram 36, thereby allowing motion of the ram and laminations to the left. Line 52 enters shroud 50 and therewithin includes a flexible, horizontally movable, sealed tube 55 communicating with the chamber of the annular structure 56 constructed as shown in FIGURES 6 and 8. This chamber structure has the form of a hollow toroid having a rectangular cross section the inner diameter or periphery of which is located in a close, but non-contacting relationship with the periphery of the laminations making up the drum surface. The inner periphery of the toroidal structure 56 is provided with an orifice or slit, protruding or non-protruding as shown, forming jet 59 which preferably, but not necessarily, is fully annular. The jet cross section is formed to direct a high velocity output stream of pressurized air essentially inwardly along all radii of the drum in a given plane, and may, if desired, be tilted a little to direct the air also slightly to the left, as viewed in FIGURE 7.

When air is forced through annular jet 59, the dynamic pressure developed between two adjacent lamination edges is sufficient to initiate motion of the left hand portion 60 of the laminated drum toward the left, as shown in FIGURE 7. The force to cause this motion is built up rapidly as soon as a very small displacement of the left hand portion of the drum has occurred. Since the clearance and path length between the annular jet 59 and the drum surface are such as to form a total orifice of resistance comparable to or greater than that of the jet, a positive pressure is built up in the open volume 62 (FIGURE 7) communicating directly with the jet. This pressure causes the left hand portion 60 of the divided drum shown in FIGURE 7 to move further and further to the left until its motion is arrested by the seating of the ram 36 against the left end of shroud 50. It can be seen now that the two portions 60 and 64 of the divided drum form two pistons being forced out toward opposite ends of an open cylinder by intervening pressurized air.

FIGURE 8 shows a cross-sectional view of the laminar drum assembly taken through the air tight housing or shroud 50, through the annular chamber structure 56 on a line slightly to one side of jet 59, and through the annular carriage 58 with the transducer assembly 8 being shown in elevation. Bolts 61 hold the chamber structure to the inner periphery of carriage 58. Transducer carrying arm 9 is arranged to rotate with rod 63 which in turn is attached (as by welding) to carriage 58. Therefore, the annular chamber structure 56, its jet 59, and the transducer carrying arm 9 (when retracted to its dotted line 65 position) can move together as a unit with carriage 58 as the latter is moved longitudinally on shaft 16 by lead screw 67.

Further, the counting air jet 29 also moves with carriage 58. As a specific embodiment FIGURE 8 shows jet 29 combined with the pressure variation sensing element 33, the latter being a barium titanate plate-like crystal with a small central hole forming the jetting orifice. The crystal can be mounted on the inner periphery of carriage 58 on either side of the annular chamber structure 56, or as shown, flush with a small section of the inner periphery of the chamber structure 56 with jet 29 being in radial alignment with the annular jet 59. The pressurized air for jet 29 is conveyed thereto via a line 69 from a pump 42 outlet (FIGURE 6) which provides a lower pressure than does the outlet connected to line 44.

Although the counting jet 29 has been described as a separate entity from annular jet 59, it is of course possible to eliminate jet 29 and operate jet 59 alternately with relatively low pressure air for counting purposes and then with relatively high pressure air for drum dividing purposes, merely by adding another valve (like valve 40 in FIGURES 6 and 7) to the pneumatic system so that its inputs are alternately lines 44 and 69 with its two outputs being both connected to line 52.

To illustrate the capacity of this storage system, a drum diameter of 16 inches is chosen. In order to prevent excessive variations of the signal output from the transducing head due to diameter differences of the different record track and consequent variation in relative velocity between the record surface and the head, approximately only 50% of any lamination's radius is preferably employed. This, however, provides about a 75% volumetric efficiency in use of the cylindrical record volume, and allows adequate room for a heavy central shaft. The effective magnetic storage area of each drum lamination including both faces thereof is approximately 300 square inches with 50% radial usage. If a bit-density of 80 bits per inch of track and 25 concentric tracks per inch of lamination radius used is assumed, each record stores approximately $6\times10^5$ bits. Employing the above figures, storage of $10^9$ bits will require 1,667 laminations or a compressed drum length of 16.67 inches assuming a lamination thickness of 0.01 inch.

In order to insert the magnetic transducing assembly 8 of the type shown in FIGURE 8 into the drum access gap after completion of drum separation and control the positioning of the transducers precisely relative to the record tracks, it is necessary to provide a mechanism for a total range of radial transducer carrying arm adjustment of approximately 4 inches (in keeping with the example of 50% usage of a 16 inch record) having a location precision of about 0.0005 inch. Although this invention is not limited to a plurality of transducers since just one transducer will suffice for some of the objectives of this invention, it is preferred that a group of several transducing heads be contained on both sides of the transducing head carrier or arm 9 (FIGURE 8) to allow, when desired, simultaneous signal recording and/or reproducing on several storage tracks by heads on either or both sides of arm 9. Since, as per the example, the total radial distance available for magnetic storage is approximately 4 inches, a transducing system employing one transducer per eight tracks requires only twelve transducers. FIGURE 8 illustrates arm 9 rotated in its most counter-clockwise direction with each head being over a different concentric record track on the recording surface 22. It is to be understood that between each adjacent pair of tracks shown, there are seven other concentric record tracks making twelve sets of eight adjacent tracks with each different set being associated with a different one of the twelve transducers. Therefore, besides being capable of inserting arm 9 into the access gap, the insertion control device must be capable of precisely positioning the arm within the gap to any one of eight different positions.

The device used to achieve this eight point location is partially shown schematically in FIGURE 9. It is an adaptation of a critical-flow pneumatic instrument disclosed by W. A. Wildhack in the "Review of Scientific Instruments," January 1950, page 25. The general form of the device employs the flow of air through two nozzles or orifices separated by an otherwise closed volume. As applied in this instance, two such systems are employed back-to-back to achieve the desired locating mechanism. The device employs a loose-fitting piston 66 sliding within a closed cylinder 68. Clearance 70 between the piston body and cylinder walls is relatively large. Approximately centered on piston 66 is a flat topped, sharp edged, narrow piston-ring 72 which fits very closely to the inside diameter of cylinder 68. A piston rod 74 is employed to make the piston motion available to move an external mechanical load, i.e., the radial arm 9 (FIGURE 8) holding the transducers, in a manner yet to be described relative to FIGURE 1. High pressure air is fed from a conventional high pressure system (not shown, but input line 75 may be from a high pressure outlet of pump 42 (FIGURE 6), simutlaneously to both ends of the cylinder via lines 76 and 77. At or near each point of entrance to the cylinder, the high pressure air lines 76 and 77 are restricted by means of small identical orifices 78 and 80 respectively. The effect of these constrictions is to cause the pressure of air entering from them to decrease when the velocity of flow increases. The upper cylinder wall 82 is pierced at several points with eight (in keeping with the example) small, circular, identical sharp-edged vent holes, one for each precision locating position desired for the transducer carrying arm 9 of FIGURE 8. For convenience only four such vents 84, 86, 88 and 90 are shown in FIGURE 9. The width of the piston ring 72 is slightly less than the vent hole diameter. Each vent hole is further provided with a normally closed ball valve, those for the vents shown being valves 92, 94, 96 and 98. The positioning of the valves up or down is controlled by solenoids with solenoids 93, 95, 97 and 99 being normally unenergized so as to keep the respective valves normally downward and the vents normally closed. Any one, and only one, of the solenoids is energized at a time by a signal on one of the output lines in the trunk line from the address translator 101 when gate 103 is enabled by an "on" signal from circuit 35 (FIGURE 5) on line 105 sufficiently delayed in unit 107 (FIGURE 9) to allow for full division of the drum by the annular jet 59 (FIGURE 7). The signal from translator 101 (FIGURE 9) indicates by the output line on which it appears, the radial address of the information to be recorded or read.

When all vents are closed in FIGURE 9, pressure will build up on the cylinder equally on both sides of the piston and no motion will take place. Now, assume that ball valve 94 is raised as shown while piston 66 is to the left of vent 86 (for example, in the position indicated by the dotted piston 109) and the remaining valves are closed. Since the vent hole area is comparable to that of the input orifices 78 and 80, the pressure on the right hand side 100 of the piston will drop rapidly, exhausting through vent 86 to the atmosphere or to a partial vacuum. Expansion of the air under pressure on the left hand side 102 of the cylinder will then cause the piston to move rapidly to the right. This pressure will be maintained somewhat by the flow of air through the left hand supply orifice 78 from the high pressure supply. When the piston has moved sufficiently far to the right to cause the piston ring 72 to partially occlude the open vent hole 86, the vent area will be sharply restricted and a deceleration pressure will begin to build up in the right hand chamber 100. When the piston ring moves far enough to the right to occupy exactly the center of the vent hole, air will escape with equal ease from both of the small arcuate sections 104 and 106 (FIGURE 10) of the vent hole 86 left unoccluded by the piston ring 72. The system then rapidly comes to an equilibrium where air is flowing equally into each chamber of the cylinder and flowing out under equal back pressure through the open vent hole. If a force is now exerted to displace the piston from its centered position relative to the vent hole, the exhaust orifice balance will be disturbed and pressure will increase on the side of the smaller vent orifice, causing a restoring force to be exerted and the piston to be returned close to its central position. If high pressure air is supplied and the difference between the piston ring width and vent hole diameter is made quite small, the effective stiffness of the system can be made very great thereby eliminating, or at least greatly reducing, any tendency to hunt.

Using this technique it has been possible to locate the transducing head assembly in the radial direction to within ±.0003 inch.

When it is desired to change the position of the piston, it is merely necessary to close the vent hole valve at its occupied position and open the valve at the desired new position.

The operation of the head locating mechanism can best be understood with reference to FIGURES 1, 8 and 9. The positioning device of FIGURE 9 is shown as element 68 in FIGURE 1. Connected to piston rod 74 is a linkage 108 which is keyed or otherwise secured to rod 63 so that rod 63 is free to slide lengthwise in linkage 108 but is not free to rotate except when linkage 108 is rotated. The rod is attached to transducer carrying arm 9 as previously indicated relative to FIGURE 8. When a particular radial location is desired, a signal is gated from the address translator 101 to actuate a solenoid for opening one of the valves on cylinder 68. This results in a motion of linkage 108 in one of the directions indicated by arrow 112 in FIGURE 1, downward if this is to cause an initial positioning of the transducer carrying arm 9 into the gap. This motion is transmitted via rod 63 to arm 9 causing it to move from its instant position, for example its rest position indicated by dotted line 65 in FIGURE 8, to a precise position in the access gap (FIGURE 2*c*) determined by which of the ball valves of cylinder 68 is open.

To allow information to be transduced by one or more of the heads as determined by the address translated in unit 110, the trunk line 112 includes gating means 114 which is enabled by an "on" signal from circuit 35 (FIGURE 5) via line 116 after sufficient delay in unit 118 (FIGURE 8) to allow arm 9 to be precisely positioned within the access gap. Information is then conveyed from the input register in unit 110 to the predetermined record track or tracks, and/or vice versa to the output register.

After the appropriate reading or writing registers are activated, another signal is issued from the address translator 101 of FIGURE 9 to de-energize any energized solenoid thereby closing all the vents on cylinder 68 causing the transducer mounting assembly 8 of FIGURE 8 to be withdrawn from the record stack back to its rest position. The laminations are then compressed as in FIGURE 6, and carriage 58 is, if desired, returned by means later described to its position at the right-most end of the lamination stack as shown in FIGURE 1.

In order to illustrate the air pressure requirements and the resulting access times for the exemplary embodiments of this invention, an analysis of the laminar storage device so far described will now be made. It is to be understood that the following dimensions and characteristics of the present invention are illustrative and not limitative.

For the dimensions of the laminar drum file already given, i.e. a drum made up of 1,667 separate laminations 16 inches in diameter and 0.01 inch thick, assume that it is desired to open a 1 inch gap in $\frac{1}{10}$ second. To a first approximation, assume that the velocity versus time curve of this motion is an isosceles triangle. This means that it is necessary to accelerate the mass of the discs from rest to a ½ inch distance in $\frac{1}{20}$ second, or an acceleration of 400 inches/sec./sec. If "Mylar" laminations are employed, and the greatest mass is to be moved (i.e. motion of the entire drum is to be considered), the weight to be moved will be approximately 145 pounds. An accelerating force of about 150 pounds is then required. With a 6 inch diameter central shaft, the effective area acted on by air pressure is 173 square inches and the total air pressure required to accelerate the entire drum, in the manner chosen, will be slightly over 0.84 p.s.i. A doubling in the acceleration time, i.e., to 0.2 sec., will reduce the required accelerating pressure to only 25% of the above figure, or to a value of about 0.22 p.s.i.

In addition to the pressure required to accelerate the drum, a considerable force is necessary to overcome friction of sliding against the central shaft. Even if the relatively high coefficient of friction of 0.3 is assumed, the force required to slide the drum on its shaft will be approximately 36 pounds. This then requires an additional pressure of 0.2 p.s.i. Therefore, the total actuating pressure required to divide the drum in a 0.2 second period is slightly over 0.4 p.s.i.

The annular jet orifice 59 FIGURE 7 may be $\frac{1}{64}$ inch with a $\frac{1}{64}$ inch clearance being maintained between the annular chamber structure 56 and the drum periphery. If a practical stagnation pressure of one p.s.i. is to be obtained through a $\frac{1}{64}$ inch orifice of about 51 inches in length (approximate circumference of 16 inch drum), an air flow of about 100 c.f.m. is required. An additional pressure difference of at least 1 p.s.i. must be maintained across the effective orifice formed between the annular chamber structure 56 and the laminar periphery. Therefore a safe flow condition can be maintained in the drum dividing mechanism with an air flow of 100 c.f.m. at a total pressure differential of 2 p.s.i. Such conditions may be obtained when centrifugal pump 42 in FIGURES 6 and 7 has approximately a horsepower capacity.

With the system just described, the drum dividing operation can be made to occur in a time not exceeding 0.2 second.

A servomechanism for axially locating carriage 58 (FIGURE 8) and the items it carries (the annular chamber structure 56 with its jet 59, transducer mounting assembly 8, and the counting jet assembly 29, 33) may make use of the output signals from comparator counting circuit 35 in FIGURE 5. As previously indicated, carriage 58 is moved along the laminated drum 6 by rotation of lead screw 67. Preferably an odd number of lead screws is employed for this purpose, and more preferably three equally spaced lead screws are used as in a lathe saddle mechanism. However, for simplicity of explanation, only one is shown and for the sake of convenience, lead screw 67 is illustrated in FIGURE 5 below the drum, although it may preferably be at the top of carriage 58 as shown in FIGURES 1 and 8.

Lead screw 67 is rotated by motor 120 which is turned on by a signal on line 122 when it appears from circuit 35. Such a signal is caused to appear whenever the translated address number in the form of signals on line 43 is different from the instant setting of the counter in circuit 35. As one embodiment of circuit 35, it may be a conventional counting circuit which can be preset to any number corresponding, within range of the counter, to the unique address number from translator 45. When such presetting occurs, a signal of one polarity, say positive, issues on line 47. This starts motor 120 and also motor 124. At this time there is no output or an "off" signal from circuit 35 on line 49 and a like signal on line 126. Therefore, the two braking means 128, 130 are off so that motors 120 and 124 are free to turn shafts 132 and 134 respectively.

Lead screw 67 is connected to the right of standard 131 to shaft 132 only by key 136, and by virtue of the longitudinal keyway 138 inside the end of lead screw 67, the lead screw may move longitudinally when caused to do so. At its other end and to the left of standard 140, lead screw 67 has a reduced diameter portion 142 with another set of threads in screwed relation with nut 144 which otherwise is secured to rotate with shaft 134. Both motors 120, 124 rotate their respective shafts at the same speed and in the same direction, say counter-clockwise when viewed from the right side of FIGURE 5, in response to a positive signal on line 47. This prevents any relative movement of nut 144 and the narrowed end 142 of the lead screw while the motors are unbraked.

As an example, assume carriage 58 is against its right end blocks or stops 146, 148 before the motors start. Then, when lead screw is turned by motor 120, carriage 58 begins moving leftward. As it does, jet 29 and the intervening means cause discrete signals to appear on line 41, one such signal for each lamination interface or edge traversed. Each signal on line 41 causes circuit 35 to count down from the number to which it was preset by the unique address signals on line 43. At a predetermined count, say ten, from zero, an "on" signal appears on line 126. This actuates brake 128 and causes lead screw to stop rotating. However, after such a coarse adjustment, motor shaft 134 continues to rotate nut 144 and this in connection with its micrometer-like threads provides a fine adjustment of lead screw 67 by pulling it and carriage 58 relatively slowly leftwardly. When the count in circuit 35 reaches zero indicating the annular jet inside carriage 58 is adjacent the addressed lamination interface, an "on" signal issues on line 49 to actuate brake 130 and stop all movement of carriage. This ends the signals on line 41 and the count in a circuit 35 stays at zero until it is desired to return the carriage to its rest position.

After the gap for access to one or the other of two adjacent lamination faces has been formed and the desired information read or written on the addressed track or tracks, the address translator provides a reset signal which allows circuit 35 to operate in the reverse direction. The output signal on line 47 is then of opposite polarity (negative) causing motors 120, 124 to run in a clockwise direction with only motor 124 being able to turn its shaft 134 first since its brake is off but brake 128 is still on. This causes lead screw 67 to be moved to the right until the micrometer screw head 146 is pushed against the right inside part 148 of nut 144. At this time the count in circuit 35 is such as to provide an "off" signal to brake 128 and the lead screw is rotated until carriage 58 abut stops 146, 148.

Different types of comparator-counter circuits known to the art may be employed with the presettable, reversible type and its operation mentioned being employed for purposes of simplifying this description. It is within the scope of this invention to employ any comparison and/or counting circuitry which eliminates the need of and time utilized by resetting carriage 58 or lead screw 67 to their zero positions, i.e. all the way to the right, after finishing of the desired transducing in a given access gap. This, of course can easily be accomplished by those skilled in the art, by using circuitry which compares the actual number of signals counted on the last positioning of carriage 58 with the new address number and causing the carriage to move anew a given number of lamination interfaces or edges to the right or left in accordance with the polarity of the comparator output signal. The signal on line 47 may either be proportional to the instant difference of the count and the address number, or be an off-on signal, in accordance with the type comparator-counter circuitry employed.

Also, with the circuitry shown in FIGURE 5, or with any alternative, either or both of motors 120, 124 may be made to effect a higher reverse speed than forward speed so as to reduce the zero positioning time, and if the fine adjust motor 124 has a faster reverse speed than does the coarse adjust motor 120, the return to zero positioning of both the carriage and lead screw can be accomplished simultaneously.

The entire carriage 58 including all the parts which it carries, may be considered substantially as having a cross section of 1 inch radially by 2 inches axially and an inside diameter of 16 inches. The structure is preferably made of aluminum and then weighs approximately 5 pounds.

Assume it is desired to allot a maximum time of 2 seconds for a single coarse axial locating operation. Further assume lead screw 67 is rotated at 3600 r.p.m. and has a ½ inch diameter with a double thread at a spacing of ten threads per inch and a pitch of five threads per inch so as to provide a maximum translating velocity of twelve inches per second. A total travel of 17 inches at a rate of 12 inches per second will take approximately 1.4 seconds. Again if a triangular acceleration-deceleration curve is used, the initial acceleration and final deceleration period each occupy 0.3 second which is the equivalent of a rate of 41 inches per second. The force developed during these two periods is about ½ pound and the distance traversed is about 1.7 inches. The peak initial horsepower requirement occurs at the instant when the developed velocity becomes constant at the aforesaid 12 inches per second rate and is about $\frac{1}{1000}$ horsepower.

The fine adjustment of carriage 58 is preferred in order to reduce overshoot and hunting by a slower velocity and greater precision. Since it is desired to locate the annular jet to within ±.0025 inch in order to be within ¼ lamination thickness of the appropriate gap between lamination edges, the coarse adjustment may be stopped as above indicated when the axial locating mechanism is ten lamination edges away from its final position and the fine adjustment servo employed to count and traverse the last 10 laminations at an average speed of about $\frac{1}{10}$ inch per second. This fine adjustment period will then occupy a total of one second, taking a total of three seconds to achieve location of the desired position.

As developed above, for 16 inch diameter drums the various important functioning times can be listed as follows:

*Table I*

| Function: | Seconds |
|---|---|
| Axial locate, coarse | 2.0 |
| Axial locate, fine | 1.0 |
| Divide drum | 0.2 |
| Radial locate | 0.2 |
| Read or record | 0.1 |
| Withdraw head | 0.1 |
| Compress drum and zero axially | 2.0 |
| | 5.6 |

The above table assumes the carriage and lead screw are returned to their respective zero positions simultaneously, and of course if other circuitry is employed in circuit 35 (FIGURE 5) so as not to require zeroing thereof, the 2 seconds alloted for the lost item may be reduced to the time required to compress the drum, about 0.2 second, making the total time 3.8 seconds. The total time for a full sequence can be reduced even more, to 1.00 second, with different parameters throughout the system, as will be apparent to those skilled in the art, even without using a non-zeroing comparator-counter circuit. Further, by employing a conventional closed loop positioned servomechanism having both proportional and derivative electronic control or compensation, instead of the mechanical system described relative to FIGURE 5, and thereby eliminating any need for the counting jet 29 and its associated circuitry, the total cycle time can be reduced to approximately 1½ seconds without changing any other parameters of the system above set forth.

Other modifications and other applications of this invention not described herein will become apparent to those of ordinary skill in the art after reading this disclosure. Therefore it is intended that the material contained in the foregoing description and accompanying drawings be construed as illustrative and not limitative, the scope of the invention being defined in the appended claims.

What is claimed is:

1. In an information storage system, a laminated structure formed of a plurality of separable laminations at least some of which have at least information storage capabilities on at least one face, fluid-pressure means for releasably holding at least some of said laminations contiguously together to form a plurality of lamination interfaces, and means for effecting at least limited release by said holding means and forcibly causing the laminated structure to spread completely open at and throughout a given lamination interface, thereby providing a gap for access to at least one lamination face.

2. A system as in claim 1 including means for controlling the last mentioned means so that any one of the possible lamination interfaces can selectively be said given interface for a time.

3. In an information storage system, a laminated structure formed of a plurality of separable but normally compacted interfaced laminations at least some of which have at least information storage capabilities on at least one face, and means for causing the interfaced laminated structure to open up and divide into two wholly separated sections at a given lamination interface including means moveable along said laminated structure for forcing fluid into the structure to open the structure when caused to do so and means for causing the forcing means to move to a position adjacent said given interface and for causing the forcing means to then open said structure, thereby providing a gap for access to at least one lamination face.

4. A system as in claim 3 wherein said given interface at different times is a different one of at least a plurality of the different possible lamination interfaces, and wherein the system includes means for selectively choosing the interface adjacent to which the forcing means is moved and at which the access gap is formed.

5. In an information storage system, a laminated structure formed of a plurality of separable laminations at least some of which have at least information storage capabilities on at least one face, means for releasably holding said laminations together, jet means directed toward said structure and movable along the length thereof, means for moving said jet means along the length of said structure a predetermined distance, and means for forcing fluid through said jet means to cause said structure to spread open between the two adjacent laminations located adjacent said jet means after it has moved said predetermined distance, thereby providing a gap for access to at least one lamination face.

6. A system as in claim 5 including means for representing said predetermined distance as a unique address, each lamination interface having a different address with one of the interface addresses being the same as said unique address, means for representing the instant position of the jet means, at least during the movement thereof through said predetermined distance, as an instant address which is the same as the address for the lamination interface then closest to the jet means, and means for comparing the instant address of the jet means with said unique address to cause the jet means to stop adjacent the interface having said unique address.

7. A system as in claim 5 including means for representing said predetermined distance as a unique number, and wherein the means for moving the jet means a predetermined distance along said structure includes means for driving the jet means along the structure, means for effectively counting the number of laminations passed by the jet means when it is so driven, and means including comparison means for stopping the drive means and consequently the movement of the jet means when the number of laminations so counted bears a predetermined relationship to said unique number.

8. A system as in claim 7 wherein at least a part of each lamination edge is narrower than the remainder of the lamination, and wherein the counting means includes means for effectively detecting each such edge and an electronic counter responsive to the detection of each such edge.

9. A system as in claim 8 wherein at least the said narrowed lamination edge parts respectively form gaps between the corresponding edges of adjacent laminations, and wherein the edge detecting means is moved along said laminated structure and includes means for directing pressurized fluid onto said edge parts and gaps successively and means for detecting pressure variations in said pressurized fluid due to said edge gaps and for converting such variations into electrical signals for said counter.

10. A system as in claim 5 including means for representing said predetermined distance with a given characteristic and wherein the means for moving the jet means a predetermined distance along said structure includes means for driving the jet means along the structure, means associated with each of said laminations for effectively causing a representation in said given characteristic of the instant distance the jet means has been moved by the drive means, and means for comparing the instant distance representation with the predetermined distance representation to cause the drive means to stop the jet means adjacent said two laminations when the instant and predetermined distance representations bear a predetermined relationship to each other.

11. A system as in claim 10 wherein the driving means includes at least one lead screw in screwed relation with said jet means and means for adjusting the position of the jet means on the lead screw.

12. A system as in claim 10 wherein the driving means includes at least one lead screw in screwed relation with said jet means and motor means coupled to said comparing means for controlling said lead screw and thereby the movement of said jet means.

13. A system as in claim 12 wherein the motor means controls said lead screw in both its rotational and longitudinal positions in accordance with the outputs of said comparing means.

14. A system as in claim 13 wherein the motor means includes two motors one for controlling the rotational position of said lead screw and the other for controlling its longitudinal position.

15. A system as in claim 5 and further including at least one information transducer, means for carrying said transducer to said access gap, and means for moving said transducer into said access gap for allowing transducing of information relative at least to said one lamination face.

16. A system as in claim 5 and further including transducer means, means for carrying said transducer means, means for controlling the position of the transducer carrying means and means for moving said carrying means in conjunction with said jet means, whereby the carrying means is in a position to move into said access gap under control of the controlling means to allow information transducer by said transducer means relative at least to said one lamination face.

17. A system as in claim 16 wherein the transducer means includes a plurality of transducers and the transducer carrying means includes an arm holding said transducers and moveable from without said access gap to at least one given position therewithin under control of said controlling means.

18. A system as in claim 17 wherein the controlling means is capable of positioning said arm at a plurality of different positions within said access gap, at least two of said transducers being on the same side of said arm, the arrangement being such that each of said two transducers can be disposed within said access gap at at least two different positions.

19. A system as in claim 18 wherein the controlling means includes a cylinder closed at both ends, a piston carrying a ring within said cylinder and having a rod extending through one of the cylinder ends, means including two orifices for conveying pressurized fluid from a single source to opposite ends of said cylinder, a plurality of fluid escape openings along the length of said cylinder and a like plurality of valves respectively for said openings, each opening being wider in the direction of cylinder length than is said ring in that direction, said piston rod being coupled to said arm and operating to position the arm within said gap at a point determined by which one of said fluid escape openings is opened by its corresponding valve.

20. In an information storage system, a drum-like structure formed of a plurality of separable disc-like laminations each of which has a plurality of information storage tracks on each face, means for compacting said laminations a predetermined amount, means for dividing said structure by fluid pressure action into two sections to provide a gap between two adjacent laminations, transducing means, and means for inserting the transducing means into said gap for allowing information transducing relative to any of the storage tracks facing the gap.

21. In an information storage system, a drum-like laminated structure formed of a plurality of separable disc-like laminations each of which has a plurality of information storage tracks on each face, fluid-pressure means for compressing said laminations together and alternately for releasing the compression therefrom to allow the laminated structure to be extended a given length by dividing the structure at any given lamination interface into two sections, means for so dividing said structure to provide a gap of said given length between two adjacent laminations for access to any of the information storage tracks facing the gap, transducing means, and means for inserting the transducing means into said gap for allowing information transducing relative to any of the tracks facing the gap.

22. In an information storage system, a drum-like laminated structure formed of a plurality of disc-like laminations each of which has a plurality of concentric information storage tracks on each face, means for compressing said laminations together and alternately for releasing the compression therefrom to allow the laminated structure to be extended a given length by dividing the structure at any of the possible lamination interfaces into two sections, jet means for so dividing said structure with pressurized fluid to provide a gap of said length between two adjacent laminations for access to any of the information storage tracks facing the gap, means coupled to said jet means for determining at which of the possible lamination interfaces the structure is to be divided, a transducer carrying arm moveable into and out of said gap, a plurality of transducers on each side of said arm, means for controlling the movement of said arm into and out of said gap and the substantially exact positioning of the arm within the gap so that any of the storage tracks facing the gap can have a transducer associated therewith for information transducing purposes, and means for operating at least one of the transducers when that transducer is positioned in transducing relation with a predetermined storage track.

23. A system as in claim 22 wherein said jet means includes a carriage having an annular chamber surrounding said structure with the chamber having an inner slot forming a jet directed toward said structure, the edge of each lamination being narrower than the remainder thereof, the means coupled to the jet means for determining the lamination interface at which the structure is to be divided including a second jet carried by said carriage for effectively counting the number of lamination edges as the carriage is moved along the structure, means for so moving the carriage including at least one lead screw and motor means therefor coupled to said second jet for causing the carriage to stop after a predetermined lamination edge count, said transducer carrying arm being disposed on said carriage, means operative after the carriage has stopped to cause the arm controlling means to begin movement of the arm into the gap, and means operative after the arm movement is substantially stopped within the gap for causing the transducer operating means to operate.

24. In an information storage system, a drum-like structure formed of a plurality of separable disc-like laminations each of which has a plurality of information storage tracks on each face, there being a gap between only two adjacent laminations, transducing means, and fluid pressure means for inserting the transducing means into said gap for allowing information transducing relative to any of the storage tracks facing the gap.

25. In an information storage system a laminated structure formed of a plurality of separable disc-like laminaleast some of which have information stored on at least one face, means for movably holding at least some of said laminations together to form a plurality of interfaces and fluid means for causing the laminations forming a given one of said interfaces to move bodily apart without substantial flexing thereof to form a full access gap to at least one lamination face in the gap.

26. In an information storage system, a lamination structure formed of a plurality of separable laminations at least some of which have at least information storage capabilities on at least one face, means for movably holding at least some of said laminations together along a given axis in a parallel manner and fluid means for causing relative movement of at least a given adjacent two of some laminations in opposite directions along said axis while maintaining said two laminations substantially parallel to form a full access gap to at least one lamination face in the gap.

27. A system as in claim 26 wherein said holding means movably holds at least said some laminations contiguously to form a plurality of lamination interfaces, and said movement means wholly separates said two laminations throughout their interface.

28. In a random access memory, the combination of: a frame; a plurality of information storage discs; a mandrel rotatably mounted in said frame, said mandrel having opposed end plates defining a disc space therebetween, said plurality of discs being carried on said mandrel between said end plates and parallel thereto for rotation therewith, said discs filling said disc space except for a work gap, said discs being slideable along their axes relative to said mandrel for positioning said work gap between any adjacent pair of discs with the remaining discs in solid stacks; disc moving means mounted in said frame and positionable at said work gap, said disc moving means being movable parallel to the axis of said mandrel, said disc moving means including means for directing fluid under pressure into said gap adjacent each of the discs defining said gap; and means for translating said disc moving means relative to said mandrel.

29. In an information storage system, a laminated structure formed of a plurality of separable laminations at least some of which have at least information storage capabilities on at least one face, means for holding said laminations generally compacted together, jet means directed toward said structure and movable along the length thereof, means for moving said jet means along the length of said structure, and means for forcing fluid through said jet means to cause a lamination face access opening between any two adjacent laminations located adjacent said jet means.

30. In an information storage system, a laminated structure formed of a plurality of separable laminations at least some of which have at least information storage capabilities on at least one face, means for holding said laminations generally compacted together, jet means directed toward said structure and movable along the length thereof, means for moving said jet means along the length of said structure a predetermined distance, and means for forcing fluid through said jet means to cause an access opening to a desired lamination face between the two adjacent laminations located adjacent said jet means when it has moved said predetermined distance.

References Cited in the file of this patent

UNITED STATES PATENTS

| | | |
|---|---|---|
| 2,132,993 | Mitchell | Oct. 11, 1938 |
| 2,265,879 | Thurm | Dec. 9, 1941 |
| 2,498,746 | Walker | Feb. 28, 1950 |
| 2,643,127 | Gregg | June 23, 1953 |
| 2,650,830 | Potter | Sept. 1, 1953 |
| 2,690,913 | Rabinow | Oct. 5, 1954 |
| 2,800,642 | May | July 23, 1957 |
| 2,910,669 | Brand | Oct. 27, 1959 |
| 2,960,340 | Seidel | Nov. 15, 1960 |

OTHER REFERENCES

"Engineering Design of a Magnetic-Disc, Random-Access Memory" (Noyes et al.), IBM Technical Publication, received Dec. 11, 1957 (7 pp.).

FOREIGN PATENTS

| | | |
|---|---|---|
| 652,097 | Great Britain | Apr. 18, 1951 |
| 213,527 | Australia | Feb. 24, 1958 |

UNITED STATES PATENT OFFICE
CERTIFICATE OF CORRECTION

Patent No. 3,130,393 April 21, 1964

Robert P. Gutterman

It is hereby certified that error appears in the above numbered patent requiring correction and that the said Letters Patent should read as corrected below.

Column 1, line 39, for "capaciy" read -- capacity --; column 2, line 1, for "schmatic" read -- schematic --; column 14, line 14, for "disc-like lamina-" read -- laminations --; line 15, before "least", first occurrence, insert -- at --; line 18, after "fluid" insert -- pressure --; same column 14, line 27, after "fluid" insert -- pressure --.

Signed and sealed this 3rd day of November 1964.

(SEAL)
Attest:

ERNEST W. SWIDER
Attesting Officer

EDWARD J. BRENNER
Commissioner of Patents